United States Patent
Sathyanaraya et al.

(10) Patent No.: US 11,237,881 B2
(45) Date of Patent: Feb. 1, 2022

(54) MESSAGE CONNECTOR AS A SERVICE TO MIGRATE STREAMING APPLICATIONS INTO CLOUD NATIVITY

(71) Applicant: Kyndryl, Inc., New York, NY (US)

(72) Inventors: Poornima Sathyanaraya, Bangalore (IN); Raghava Reddy Kapu Veera, Bangalore (IN); Deepak Poola Chandrashekar, Bangalore (IN); Sreekrishnan Venkateswaran, Bangalore (IN)

(73) Assignee: KYNDRYL, INC., New York, NY (US)

( * ) Notice: Subject to any disclaimer, the term of this patent is extended or adjusted under 35 U.S.C. 154(b) by 187 days.

(21) Appl. No.: 16/573,537

(22) Filed: Sep. 17, 2019

(65) Prior Publication Data
US 2021/0081256 A1 Mar. 18, 2021

(51) Int. Cl.
*G06F 9/50* (2006.01)
*G06F 9/54* (2006.01)
*H04L 29/08* (2006.01)
*G06F 9/48* (2006.01)

(52) U.S. Cl.
CPC .......... *G06F 9/5088* (2013.01); *G06F 9/4875* (2013.01); *G06F 9/5033* (2013.01); *G06F 9/546* (2013.01); *H04L 67/10* (2013.01)

(58) Field of Classification Search
CPC .... G06F 9/4875; G06F 9/5033; G06F 9/5088; G06F 9/546; H04L 67/10
See application file for complete search history.

(56) References Cited

U.S. PATENT DOCUMENTS

| | | | |
|---|---|---|---|
| 6,978,305 B1 * | 12/2005 | Nainani | H04L 67/02 709/206 |
| 7,093,261 B1 | 8/2006 | Harper et al. | |
| 7,379,599 B1 | 5/2008 | Blais-Morin et al. | |
| 7,844,759 B1 | 11/2010 | Cowin | |

(Continued)

FOREIGN PATENT DOCUMENTS

| | | |
|---|---|---|
| EP | 1715646 A1 | 10/2006 |
| WO | 2018/046904 A1 | 3/2018 |

OTHER PUBLICATIONS

Mell, P. et al., "The NIST Definition of Cloud Computing," 2011, 7 pages.

(Continued)

*Primary Examiner* — Jorge A Chu Joy-Davila
(74) *Attorney, Agent, or Firm* — Tutunjian & Bitetto, P.C.; Ken Han

(57) ABSTRACT

A computer implemented method for migrating streaming applications from on-premise non-cloud infrastructure to target clouds. The method may include receiving at the message connector a source message from an on-premise application. The method may further include analyzing the source message to assess feasibility of migrating the on-premise application to the target cloud wherein analysis includes extracting communication data from the source message and meta data from the source message. The method may also include converting the source message to a format native to the target cloud application, wherein the conversion by the message connector includes a cognitive engine to match a selected target cloud to the on premise application.

20 Claims, 11 Drawing Sheets

(56) References Cited

U.S. PATENT DOCUMENTS

| | | | |
|---|---|---|---|
| 9,235,286 B2 | 1/2016 | Nakano et al. | |
| 9,419,984 B1* | 8/2016 | Evans | H04L 63/029 |
| 9,547,673 B1 | 1/2017 | Britton et al. | |
| 10,171,322 B2 | 1/2019 | Alewine et al. | |
| 10,193,877 B2 | 1/2019 | Chizhov et al. | |
| 2003/0126077 A1 | 7/2003 | Kantor et al. | |
| 2003/0135547 A1 | 7/2003 | Kent et al. | |
| 2012/0303740 A1* | 11/2012 | Ferris | G06F 16/278 |
| | | | 709/217 |
| 2013/0067595 A1* | 3/2013 | Pierre | G06F 21/6218 |
| | | | 726/28 |
| 2014/0108523 A1 | 4/2014 | Paramasivam et al. | |
| 2015/0341445 A1 | 11/2015 | Nikolov et al. | |
| 2015/0373103 A1* | 12/2015 | Tessier | H04L 67/1095 |
| | | | 709/203 |
| 2016/0337465 A1 | 11/2016 | Tarre et al. | |
| 2017/0099362 A1* | 4/2017 | Almond | H04L 67/26 |
| 2017/0118217 A1 | 4/2017 | Sama et al. | |
| 2017/0195259 A1* | 7/2017 | Florea | H04L 69/22 |
| 2017/0201509 A1 | 7/2017 | Alewine et al. | |
| 2018/0007027 A1 | 1/2018 | Chizhov et al. | |
| 2018/0063244 A1 | 3/2018 | Maturana et al. | |
| 2018/0089081 A1* | 3/2018 | Ramalingam | G06F 11/079 |
| 2019/0141022 A1* | 5/2019 | Reeve | H04L 63/029 |
| 2019/0155870 A1* | 5/2019 | Prakash | G06F 40/143 |
| 2019/0332276 A1* | 10/2019 | Gupta | G06F 3/0659 |
| 2020/0162318 A1* | 5/2020 | Patil | H04L 67/34 |

OTHER PUBLICATIONS

Tran, N. et al., "EQS: An Elastic and Scalable Message Queue for the Cloud" 2011 IEEE Third International Conference on Cloud Computing Technology and Science (Nov. 2011) pp. 19.

* cited by examiner

MESSAGE CONNECTOR AS A SERVICE TO MIGRATE STREAMING APPLICATIONS INTO CLOUD NATIVITY

BACKGROUND

The present invention generally relates to communication services and transmitting data from communication services to a cloud platform.

Mobile based communication applications produce messages for transmission between consumers looking to communicate with one another. Software vendors for mobile based communications application can be faced with challenges when attempting to migrate their message streaming applications to the cloud in order to employ cloud services. In some instances, software venders experience data loss when migrating data, as well as having to deal with format changes, such as code changes etc. For example, a number of applications are based on-premise and they have one or more streaming components. These streaming components could potentially be either messages or events. These messages or events can be generated by producers and consumed by consumers through message queues. Enabling on-premise applications to be migrated to the cloud can include managing cloud native services for the data being migrated, e.g., the events/message data. However, there are multiple formats of data to be migrated between the on premise and cloud platforms, and there are numerous implementations of message queues, which can complicate migration of the data.

SUMMARY

In accordance with an embodiment of the present invention, a method is provided for employing a message connector for transmitting communication messages produced by an on-premise application to a target cloud. The methods described herein can port streaming applications to multiple clouds or hybrid clouds, so that the consumers employing the on premise application can exploit business benefits that will accrue from cloud nativity.

In one embodiment, the computer implemented method for migrating on-premise streaming applications from on-premise non-cloud infrastructure to public clouds includes registering target cloud locations with a message connector; and receiving at the message connector a source message from an on premise application. The computer implemented method further includes analyzing the source message for application to at least one of the target cloud applications, wherein analysis includes extracting communication data from the source message and meta data from the source message. The method may further include converting the source message to a format native to the target cloud application. The conversion by the message connector includes a cognitive engine employing at least one hardware processor to match a selected target cloud to the on premise application based upon at least the meta data. The method can continue with transmitting the source message from the message connector to the target cloud application, wherein the source message has been converted to the format for the target cloud. In one example, analyzing the source message for application includes analyzing the source upstream application message queue format and analyzing for the target cloud application includes analyzing characteristics of the cloud native messaging systems in the target cloud.

In another aspect, the present disclosure describes a system for migrating on-premise streaming applications from on premise non-cloud infrastructure to public clouds. In one embodiments, the system may include at least one interface for communicating with a cloud message queue of target cloud locations, and at least one interface for communicating with an on premise message queue for an on premise streaming application. The system also includes a message connector that analyzes the source message for application to at least one of the target cloud applications, wherein analysis includes extracting communication data from the source message and meta data from the source message. The message connector may further include converting the source message to a format for the target cloud application. The conversion by the message connector includes a cognitive engine employing at least one hardware processor to match a selected target cloud to the on premise application based upon at least the meta data.

In yet another aspect of the present disclosure, a computer program product is provided. In one embodiment, a computer readable storage medium is provided that includes a computer readable program for migrating on-premise streaming applications from on-premise non-cloud infrastructure to public clouds, wherein the computer readable program when executed on a computer causes the computer to perform the steps of registering target cloud locations with a message connector; and receiving at the message connector a source message from an on premise application. The steps stored on the computer readable storage medium also provide analyzing the source message for application to at least one of the target cloud applications, wherein analysis includes extracting communication data from the source message and meta data from the source message. The method may further include converting the source message to a format native to the target cloud application. The conversion by the message connector includes a cognitive engine employing at least one hardware processor to match a selected target cloud to policies of the on premise application based upon at least the meta data. The method can continue with transmitting the source message from the message connector to the target cloud application, wherein the source message has been converted to the format native to the target cloud.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
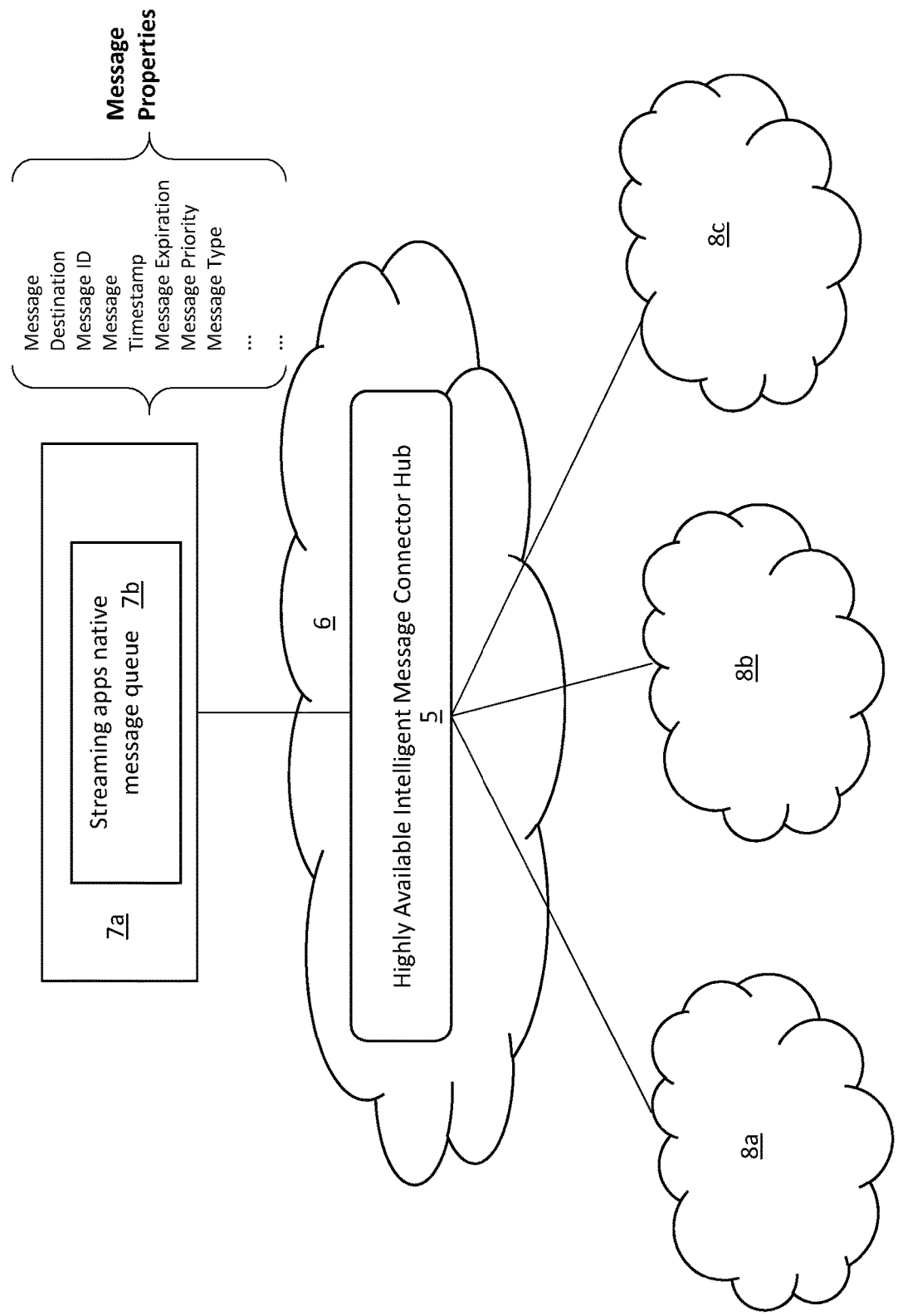
FIG. 1 is an illustration of the environment in which the system for providing a message connector as a service would operate, wherein the message connector can transfer messages from a legacy application to applications based on a cloud, in accordance with one embodiment of the present disclosure.

Detailed embodiments of the claimed methods, systems and computer program products are disclosed herein; however, it is to be understood that the disclosed embodiments are merely illustrative of the methods, systems and computer program products that may be embodied in various forms. In addition, each of the examples given in connection with the various embodiments are intended to be illustrative, and not restrictive.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

There are many mobile based applications that are producing messages which are eventually being consumed by the consumers. However, software vendors for the mobile based applications face challenges when they are migrating the message streaming applications to the cloud in order to take the full advantage cloud services, because of fearing data loss, code changes etc. For example, many mobile based applications are based on-premise and they have one or more streaming components. These streaming components could potentially be either messages or events. These messages or events are generated by producers and consumed by the consumers through message queues. To enable on-premise cloud applications to integrate with cloud native services these events/message need to be managed. However, there are multiple formats of message/events and there are numerous implementations of Message Queues, which make this problem a hard problem to solve. Additionally, lack of asynchronous decoupling and indirection based on a message brokers will not only yield unstable communication patterns, but also prevent scaling of applications. It can be important for legacy applications to respond to the demands and the need of having a message transformer in between the legacy application and the cloud. Further, it can also be important to existing solutions to port legacy applications to multi and hybrid clouds.

In some embodiments, the methods, systems and computer program products of the present disclosure offer a minimally invasive way to port streaming apps to multi and hybrid clouds, so they can exploit business benefits that will accrue from cloud nativity. In some embodiments, the methods, systems and computer program products of the present disclosure are directed to building a highly available intelligent message connector hub on the cloud (leveraging the cloud native features such as DR, SLA etc. . . . ) which would seamlessly transfer messages from streaming applications to the cloud in order to take the advantage of the benefits native to the cloud.

Moving legacy applications with traditional message queue to the cloud is a cumbersome process. This requires complex code changes to the application. Further, each message queue has its own constructs and characteristics making it extremely difficult to transform from one format to another. This can potentially result in data loss/anomalies in message delivery.

There are multiple message queue protocols, and intercommunication between them is complicated as they vary in formats and characteristics. Benefiting from the various cloud features/services for traditional legacy applications without code changes is not possible today as traditional message queues do not communicate with cloud native message queues.

In some embodiments, the methods, systems and computer program products of the present disclosure can provide an enabler that aids applications with streaming components to connect on-premise/cloud enabled message/event producers to cloud native services. In some embodiments, the methods, systems and computer program products of the present disclosure The highly available intelligent message connector hub on the cloud serves as a connector between the streaming application message queues and the cloud native message queues. This message hub processes the data as it arrives and then aggregates, perform analytics in arriving input messages data in a distributed fashion. In some embodiments, the intelligent message connector hub analyzes the upstream application message queue format and characteristics, and the cloud native messaging systems in the destined target cloud and provides a feasibility assessment. In some embodiments, an intelligent message connector hub aggregate messages from multiple on premise application messaging systems to one or multiple target cloud native messaging queue. This could occur in a scenario where one application has multiple service across geographies and an aggregation increases the application service. The framework can provide a messaging buffer to handle multiple queues and messages. The framework can also include a service to ensure deliverability of messages, which can ensure that messages are not lost in transit.

In some embodiments, the message connector has built in logic to retain the message queue attribute of either a destructive or a non-destructive read according to what is configured in the source application to maintain uniformity. Auto detection of source queue protocol can also be provided. In summation, in some embodiments of the present disclosure, the methods systems and computer program products that are described herein can enable legacy messaging apps that are run using on premise location to take advantage of cloud native services without complex code changes.

The methods, systems and computer program products for providing a message connector as a service, wherein the message connector can transfer messages from a legacy application to applications based on a cloud, is described with greater detail with reference to FIGS. 1-11.

FIG. 1 is an illustration of the environment in which the system 500 for providing a message connector as a service would operate, wherein the message connector can transfer messages from a legacy application to applications based on a cloud. Reference number 5 denotes one example of a highly available intelligent message connector hub. The highly available intelligent message connector hub 5 can hereafter be referred to as a connector hub 5. The connector hub 5 can transfer message date from the legacy applications to applications based upon a cloud. As used herein, a legacy application is a message application that uses on premise software. As used herein, "On-premises software" (also known as "on-premise", and abbreviated "on-prem") is installed and runs on computers on the premises of the person or organization using the software, rather than at a remote facility such as a server farm or cloud.

In contrast, a "cloud application", or "cloud app", is a software program where cloud-based and local components work together. This model relies on remote servers for processing logic that is accessed through a web browser with an internet connection. The connector hub 5 may be running on a cloud 6 leveraging the cloud native services, e.g., cloud disaster recovery (DR), Service Level Agreement (SLA), etc. A service level agreement (SLA) is an agreement between a service provider (whether internal or external) and their client (whether internal or external), which covers the nature, quality, availability, scope and response of the service provider. Cloud disaster recovery (cloud DR) is a backup and restore strategy that involves storing and maintaining copies of electronic records in a cloud computing environment as a security measure.

The connector hub 5 assists in re-engineering and migrating streaming applications received from a legacy application, e.g., a message application that uses on premise software, and then forwarded to a target cloud 8a, 8b, 8c to take advantage of cloud based services. The legacy application sending the message to the connector hub 5 may include a streaming application 7, which may also be called a producer. The streaming application 7 may include a streaming application native queue 8. Any application having a message/event producer, and consumer is applicable to the methods, systems and computer program products described herein. Streaming applications are included. A streaming application may include multiple messages and event synchronization. The methods, systems and computer program products of the present disclosure can manage these multiple messages and event synchronization, and take these applications to the cloud and provide the benefits of cloud native services. The message sent from the legacy streaming application sent to the connector hub 5 may have message properties, such as a message destination, message identification (ID), message timestamp, message expiration, message priority message type and other like characterizations.

The connector hub 5 receives data from the streaming application 7, processes the data as it arrives, and aggregates and performs analytics on the arriving data, wherein following processing by the connector hub 5, the data is then transmitted to the target cloud 8a, 8b, 8c to take advantage of cloud native services. The cloud services can include auto-scaling, performance monitoring event management, monitoring and enhancement. The analytics performed may include message flow rate, message size, resource utilization etc.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
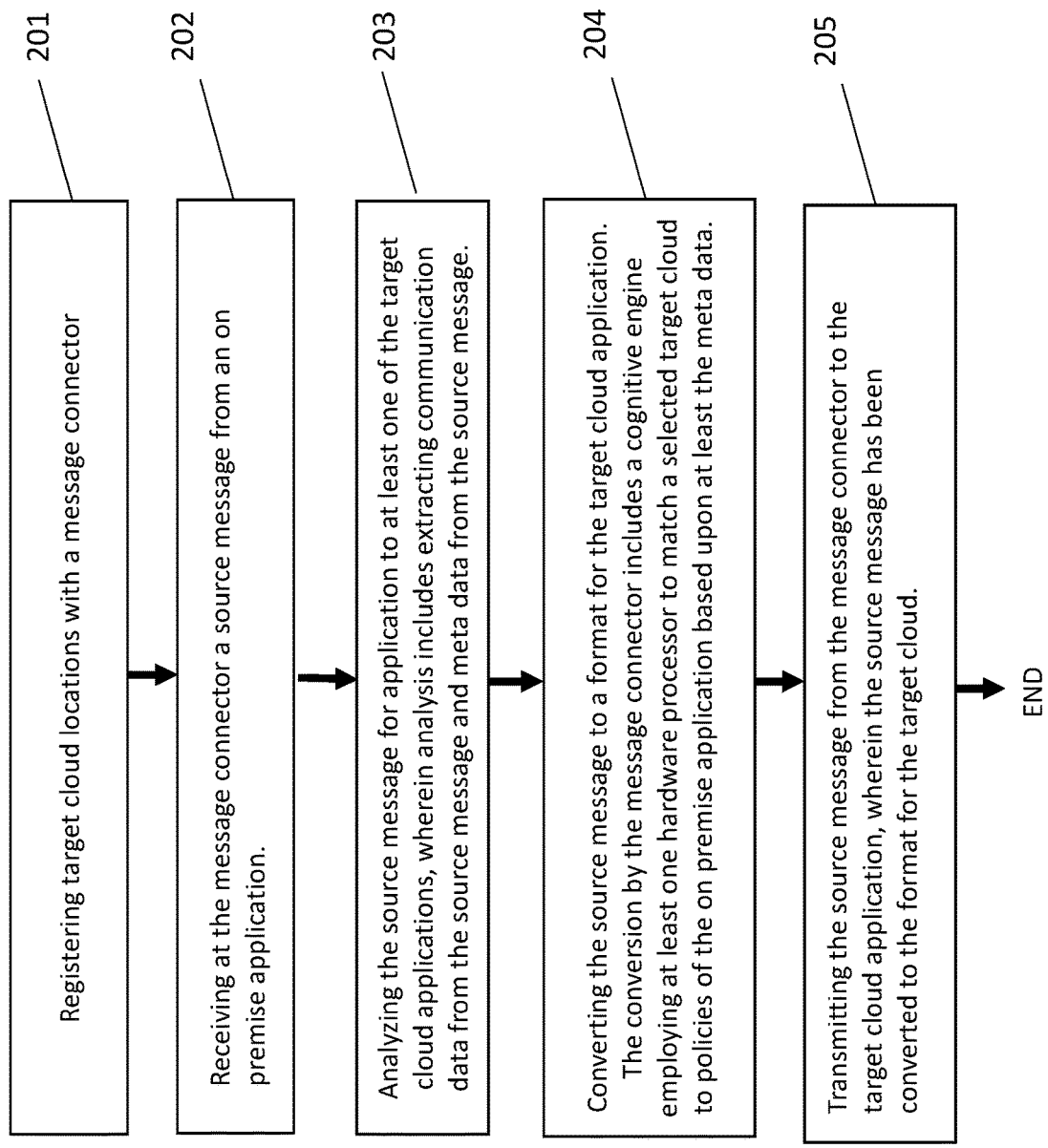
FIG. 2 is a block/flow diagram showing a process flow using the message connector to transmit message data from an on premise location to a cloud location, in accordance with an embodiment of the present invention.

FIG. 2 is a block/flow diagram showing a process flow using the message connector to transmit message data from an on premise location to a cloud location. In one embodiment, the computer implemented method for migrating on-premise streaming applications to cloud applications includes registering target cloud locations with a message connector at block 201; and receiving at the message connector a source message from an on premise application at block 202. The computer implemented method further includes analyzing the source message for application to at least one of the target cloud applications at block 203, wherein analysis includes extracting communication data from the source message and meta data from the source message. The method may further include converting the source message to a format native to the target cloud application at block 204. The conversion by the message connector includes a cognitive engine employing at least one hardware processor to match a selected target cloud to the on premise application based upon at least the meta data. Referring to block 205, the method can continue with transmitting the source message from the message connector to the target cloud application, wherein the source message has been converted to the format native to the target cloud. The method depicted in FIG. 2 is described with more detail with reference to FIGS. 3-11.

Figure 3:
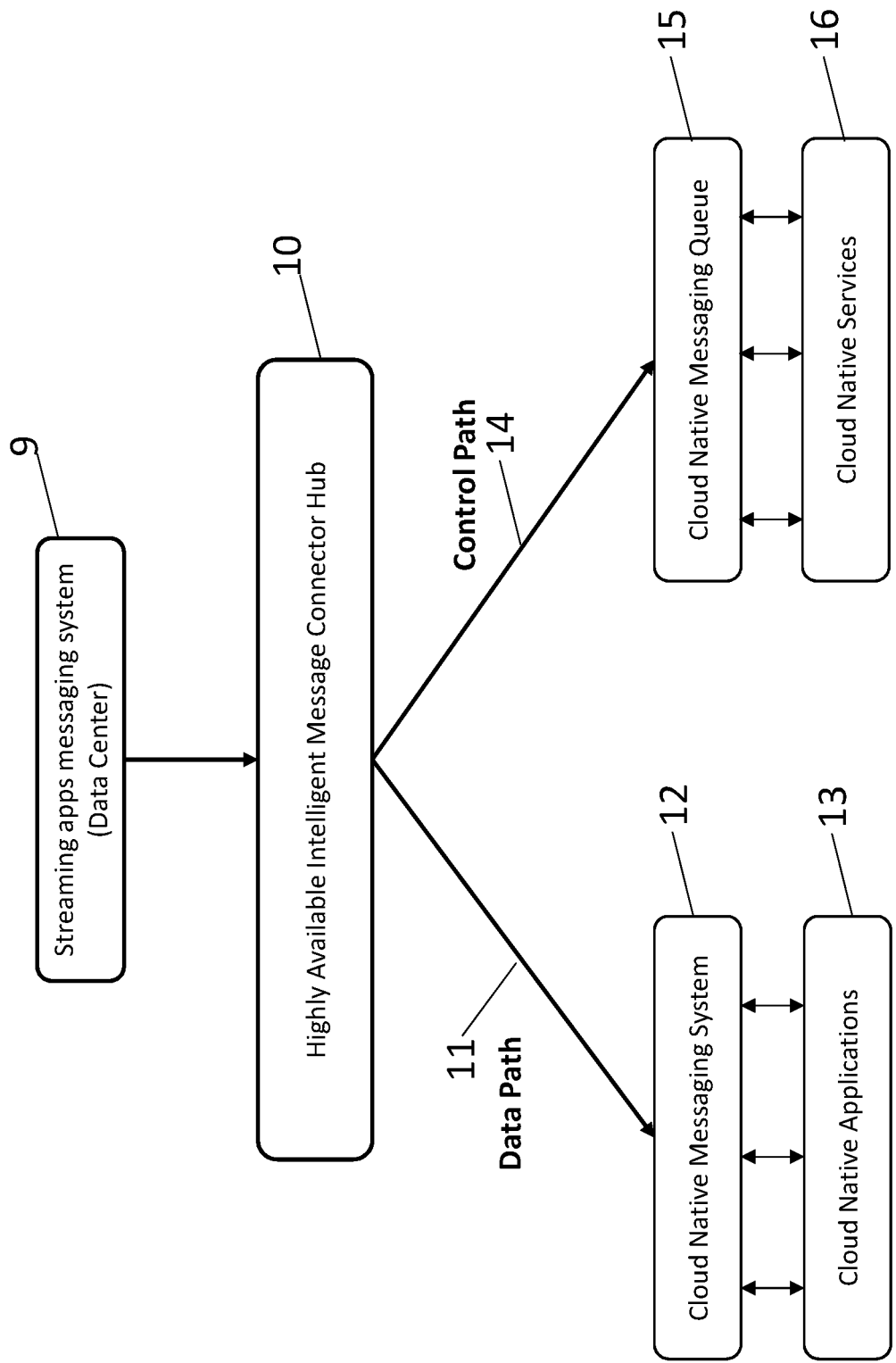
FIG. 3 is a block/flow diagram showing one embodiment a process flow using the message connector having a data path and a control path, in accordance with an embodiment of the present invention.

FIG. 3 is a block/flow diagram showing one embodiment a process flow using the message connector 2 having a data path and a control path, in accordance with an embodiment of the present invention.

In one embodiment, the data path employed by the methods, systems and computer program products that are describe here may include a streaming application messaging system, e.g., streaming application 7, at bock 5 transmitting data, such as a communication message, to the connector hub 5 at block 10. As noted above, the streaming application 7 can be run from a location running on premise software. The location may be a data center. At block 10, the connector hub 5 can assist in migrating the streaming applications from the location running the on premise software to the cloud, e.g., target cloud 8a, 8b, 8c. For example, the connector hub 5, which can also be referred to as a highly available intelligent message connector hub, can assist in re-engineering and migrating streaming applications to the cloud.

The data may be transmitted via two paths 11a, 11b following the connector hub 5, which can be a data path 11a and a control path 11b. The data path 11a can pass actual message data to a compatible message queue on a cloud. Cloud Queues can be an open-source messaging system, designed to help customers build and scale distributed applications in the cloud. The Cloud Queues Application programming interface (API) is built to be flexible, supporting a variety of messaging patterns like producer-consumer, poll based publisher-subscriber, and point-to-point. Queuing systems like Cloud Queues are meant to decouple resources in an application by serving as a communication layer between those resources. Instead of a server in an application telling another server to do a task, they post a message to a queue. Then, the server performing work can check that queue for work when it is available. This prevents an application from slowing down due to servers being busy, offline, unavailable, etc.

For example, in the control path 11b, the data flow may include a cloud native messaging queue at block 14 and cloud native services at block 15. The control path 11b may include a message data flow to transmit message metadata from the connector hub 5, such as the number of messages in the queue and the message length etc, to the cloud native message queue at block 14. The data flow between the cloud native messaging queue at block 14 and cloud native services at block 15 may be referred to as a control flow, which assists to leverage the cloud native features like notification services, auto-scaling services etc. The data flow between the cloud native messaging system at block 12 and the cloud native applications at block 13 may be referred to as to consume messages.

In one embodiment, the control path 11b is responsible for extracting the message metadata. The message metadata can include the number of messages in the queue, and the message length to the cloud native Message Queue. These will be part of any message format of a message queue. For example, the message data that the control path 11b can extract can be the number of messages in the message que (MQ), which is located in the streaming apps native message queue 7b. As described herein, the data path includes the actual message data. The control path includes the metadata about the message queue. The data path also enables the application to seamlessly pass actual message data to a compatible message queue on the target cloud. The Control Flow passes the legacy source Message Queue metadata, the number of messages in the queue to the destination target cloud. This metadata information is configured in the scaling plan written to auto-scale.

In some embodiments, the control path 11b may pass relevant metadata information to the cloud native system to take advantage of features like auto-scaling. Auto-scaling is a method used in cloud computing, whereby the amount of computational resources in a server farm, typically measured in terms of the number of active servers, scales automatically based on the load on the farm. It is closely related to, and builds upon, the idea of load balancing. In some embodiments, the control path 11b manages message buffer management, message aggregation management, queue length management and combinations of the aforementioned functions.

For example, in the data path 11a, the message data flow may include a cloud native messaging system at block 12 and cloud native applications at block 13. The data, e.g., data flow, being transmitted across these systems and applications assists in copying the actual message data originally transmitted from the streaming apps messaging system 9, e.g., data center, to the connector hub 5 at block 10. The data flow between the cloud native messaging system at block 12 and the cloud native applications at block 13 assists in copying the actual message data. This can ensure there are no code changes resulting from the traditional streaming apps, i.e., the message queue is kept uniform between the traditional on-premise software based message application, e.g., streaming applications native message queue 7b, and destination cloud, e.g., target cloud 8a, 8b, 8c. The data flow between the cloud native messaging queue at block 14, and the cloud native services at block 15 may be referred to as to integrating to leverage cloud native services.

In the abstract diagram, data path 11a is responsible for the actual transfer of the data from the source message queue, e.g., the streaming apps native message queue 7b, to the destination message queue, e.g., the message queue of the target cloud 8a, 8b, 8c without being lost in transit. This path can also take care of challenges incurred during the transfer of messages between source message queue and the destination message queues like, the lack of support for non-destructive reads in the source message queue.

Figure 4:
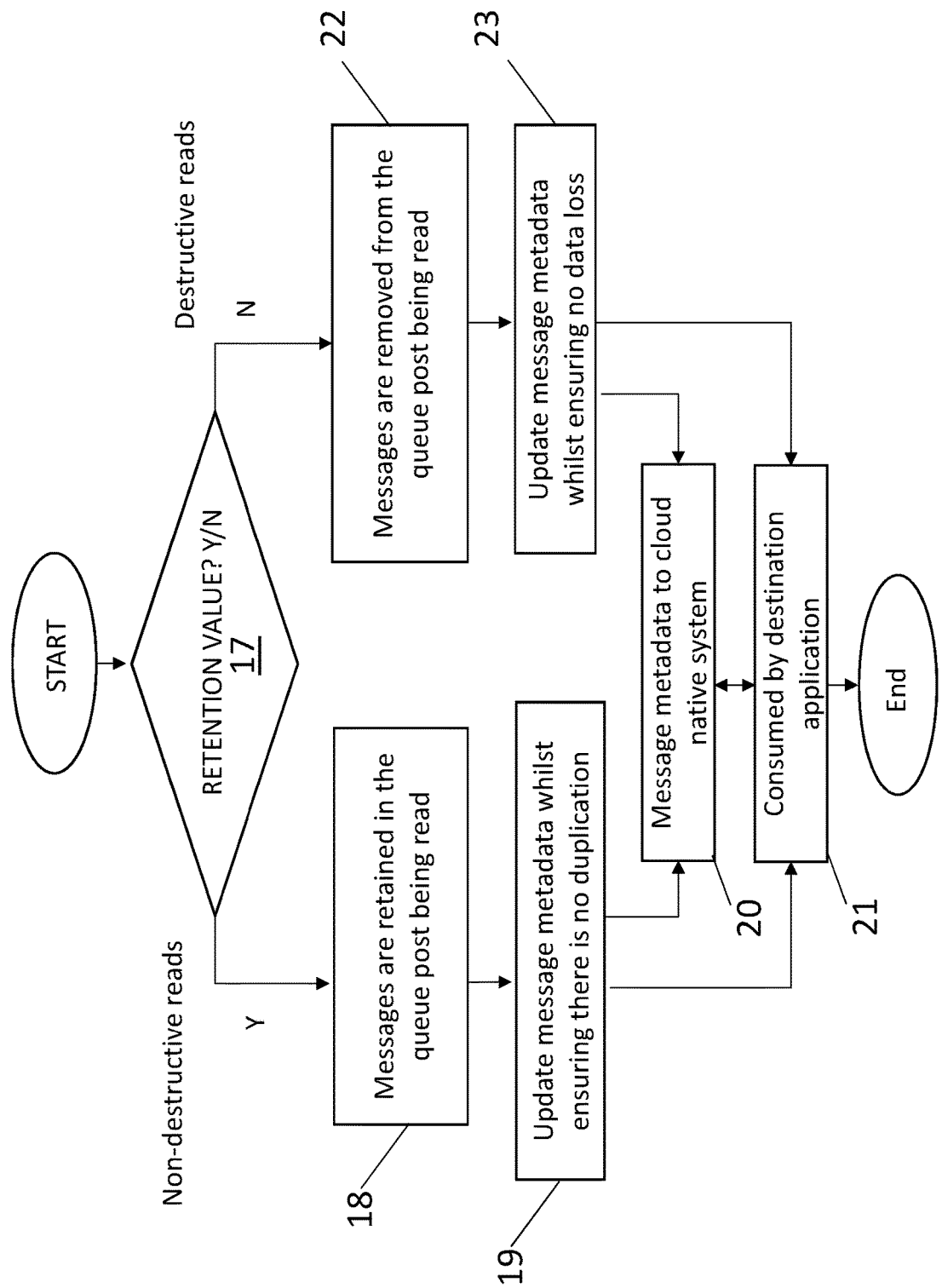
FIG. 4 is a block/flow diagram showing a data path process flow illustrating non-destructive reads and destructive reads for messages being transmitted by the message connector, in accordance with one embodiment of the present disclosure.

In one example, the messages can be read from the Message Queue in 2 different ways, e.g., destructive reads or non-destructive reads, as depicted in FIG. 4. For a "destructive read" the messages are removed from the queue post being read. For a "non-destructive read" the messages are retained in the queue post being read.

FIG. 4 is a block/flow diagram showing one embodiment of a data path process flow illustrating non-destructive reads and destructive reads for messages being transmitted by the message connector. At block 17 in the data path process flow, the message connector 5 determines the retention value of the message received from the streaming applications native message queue 7b. The retention value is whether the message is a non-destructive or destructive read. For example, the message is retained, the process flow may continue to block 18, at which the message are retained the queue post being read. If the message is to be retained, the read is a non-destructive read, the message connector 5 updates the message metadata while ensuring there is no duplication at block 19. For a non-destructive read, the process flow can continue to block 20 at which the message metadata is transmitted to the cloud. At block 21, the message data is consumed by the destination application, e.g., target cloud 8a, 8b, 8c.

Referring back to block 17, in the data path process flow when the message is not retained, the process flow continues to block 22, at which the messages are removed from the queue post being read. At block 23 of FIG. 4, the message connector 5 may update the message metadata while ensuring there is not data loss. For a destructive read, the process flow can continue to block 20 at which the message metadata is transmitted to the cloud. At block 21, the message data is consumed by the destination application, e.g., target cloud 8a, 8b, 8c.

Figure 5:
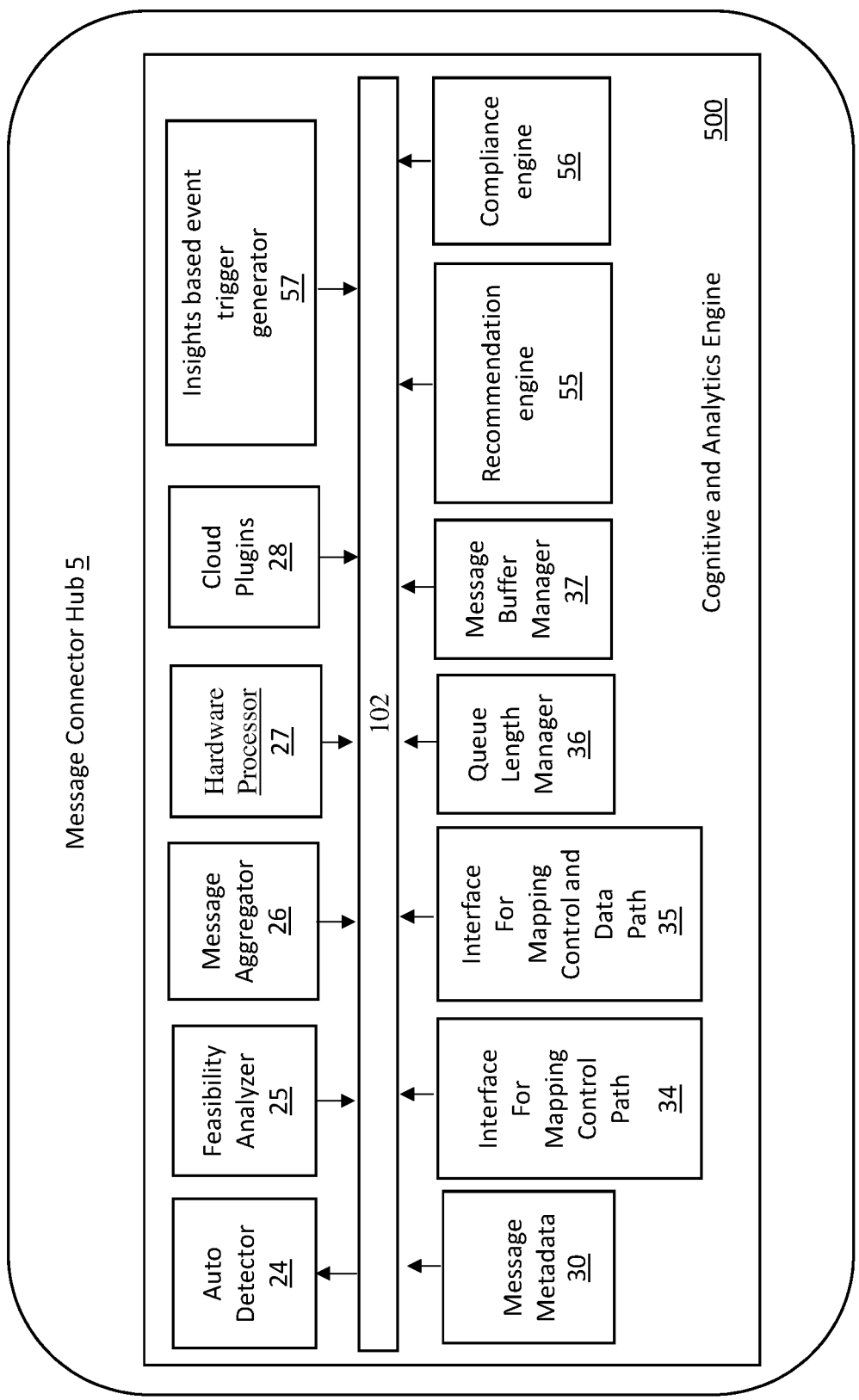
FIG. 5 is a system for a message connector that can implement the process flow depicted in FIG. 4.

FIG. 5 is a system for a cognitive and analytics engine 500 of a message connector 5 that can implement the process flow depicted in FIG. 3. The cognitive and analytics engine 500 may include an auto detector 24, a feasibility analyzer 25, a message aggregator 26, cloud plugins 28, message metadata analyzer 30, que length manager 36, message buffer analyzer 37 and interfaces for mapping to the control path 34 and interfaces for mapping to the control and data path 35. The cognitive and analytics engine 500 may also include at least one hardware processor 27, wherein each of the aforementioned components may be interconnected by a system bus 102. In some embodiments, the auto detector 24, the feasibility analyzer 25, the cloud plugins 28 and the message buffer manager 37 are mapped to the data and control path, e.g., employ the interfaces for mapping to the control and data path 35. In some embodiments, the message metadata 30, the message aggregator 26, and the que length manager 36 are mapped to the control path 34.

In some embodiments, the auto detector 24 is a module that includes polling agents. The auto detector 24 of the system for a cognitive and analytics engine 500 of a message connector 5 can where new messages are in the que from the source, e.g., the streaming applications native message queue 7*b*. For example, this module can include polling agents which can poll the source on premise message queue for any new messages in the queue. Further details of this step can be provided in the description of blocks 9 and 10 of FIG. 4. This module maps to both the data and control path 11, 14 of the process flow depicted in FIG. 4.

In some embodiments, the feasibility analyzer 25 of the system for a cognitive and analytics engine 500 of a message connector 5 can analyze the feasibility of transcoding messages between the legacy message que, e.g., the streaming applications native message queue 7*b* depicted in FIG. 1, and the chosen close native message que, e.g., target cloud 8*a*, 8*b*, 8*c*, as depicted in FIG. 1. In addition to analyzing feasibility, in some embodiments, the feasibility analyzer 25 also analyses complexity of the message, which can be scored of a scale, e.g., a scale of 1 to 5, in which a score of 5 is an indication of highest complexity. A process flow from the feasibility analyzer is illustrated in FIG. 6.

Figure 6:
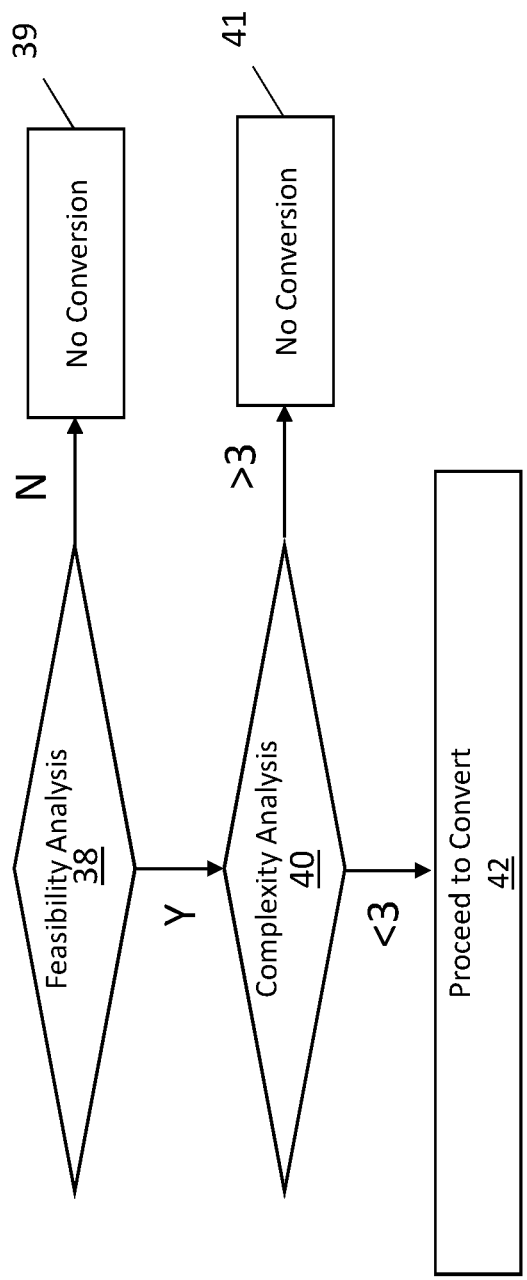
FIG. 6 is a block/flow diagram showing the process flow through a feasibility analyzer 25 of the system for a cognitive and analytics engine 500 of a message connector 5, in accordance with one embodiment of the present disclosure.

FIG. 6 is a block flow diagram showing one embodiment of the process flow through a feasibility analyzer 25 of the system for a cognitive and analytics engine 500 of a message connector 5. Beginning at block 38 a determination is needed if a feasibility analysis should be conducted. The feasibility analyzer 25 determines if a conversation is present in a message. If there is no conversation, there is no feasibility analysis to be conducted at block 39. If there is a conversation in the message data the feasibility analysis is conducted, and the process continues to block 40 at which the complexity analysis is conducted. Complexity of the conversion from one format to another can include the complexity of the entire process, such as message inflow rate, data size, application criticality etc. For example, if the complexity score is from 1 to 5, and 5 is the highest value, and the message has a high complexity equal to 3 or greater, the message data may proceed to conversion at block 42. For example, if the complexity score is from 1 to 5, and 5 is the highest value, and the message has a high complexity equal to less than 3, the message data may be no conversion for the message at block 41. This module maps to both the data and control path 11, 14 of the process flow depicted in FIG. 4.

The cloud plugins 28 of the of the system for a cognitive and analytics engine 500 of a message connector 5 is a module that contains plugins used to read the source legacy Message Queue. In some embodiments, a "plugin" is a software component that adds a specific feature to an existing computer program. When a program supports plug-ins, it enables customization. In some embodiments, the output from this module would be categorized into actual message queue data and message queue metadata. The actual message queue data is the actual message being transmitted, e.g., what information is being communicated between the parties conversing over the messaging application.

The system for a cognitive and analytics engine 500 of a message connector 5 also includes a message metadata module 30. Metadata is "data information that provides information about other data". For example, message metadata 30 consists of the metadata of the source Message Queue. Message properties may include message destination, message ID, message timestamp, message expiration, message priority, message type, and the number of messages. This message metadata can be an output of the cloud plugins 28. The message metadata 30 is passed on to the cloud, e.g., target cloud 8*a*, 8*b*, 8*c*, to leverage the cloud native features like auto-scaling etc. This module maps the control path 14 of the process flow depicted in FIG. 4.

Referring to FIG. 5, the queue length manager 36 provides a queue length of source and target message queues that can potentially vary in length or size, this module manages the queue length variations. This module communicates the differences between the legacy source queue length, e.g., streaming applications native message queue 7*b*, and the message queue of the target cloud 8*a*, 8*b*, 8*c*, and passes the same to the message buffer manager 37. This module maps the control path 14 of the process flow depicted in FIG. 4.

In some embodiments, the message buffer manager 37 manages message inflow and outflow rates. The message buffer manager 37 can maintains the order of message delivery through sequencing and timestamps. The message buffer manager 37 can monitor both inflow and outflow rates and stores the messages in a database to ensure sustained delivery. In some examples, the functions of the message buffer manager 37 additionally prevents messages from being lost in transit. In some embodiments, the message buffer manager 37 has built in logic to retain the Message Queue nature of either a destructive or a non-destructive read according to what is configured in the source application and accordingly transitions it to the destination hence ensuring there is no message loss/duplication/defect. This module maps to both the data path 11 and the control path 14 of the process flow depicted in FIG. 4.

Figure 7:
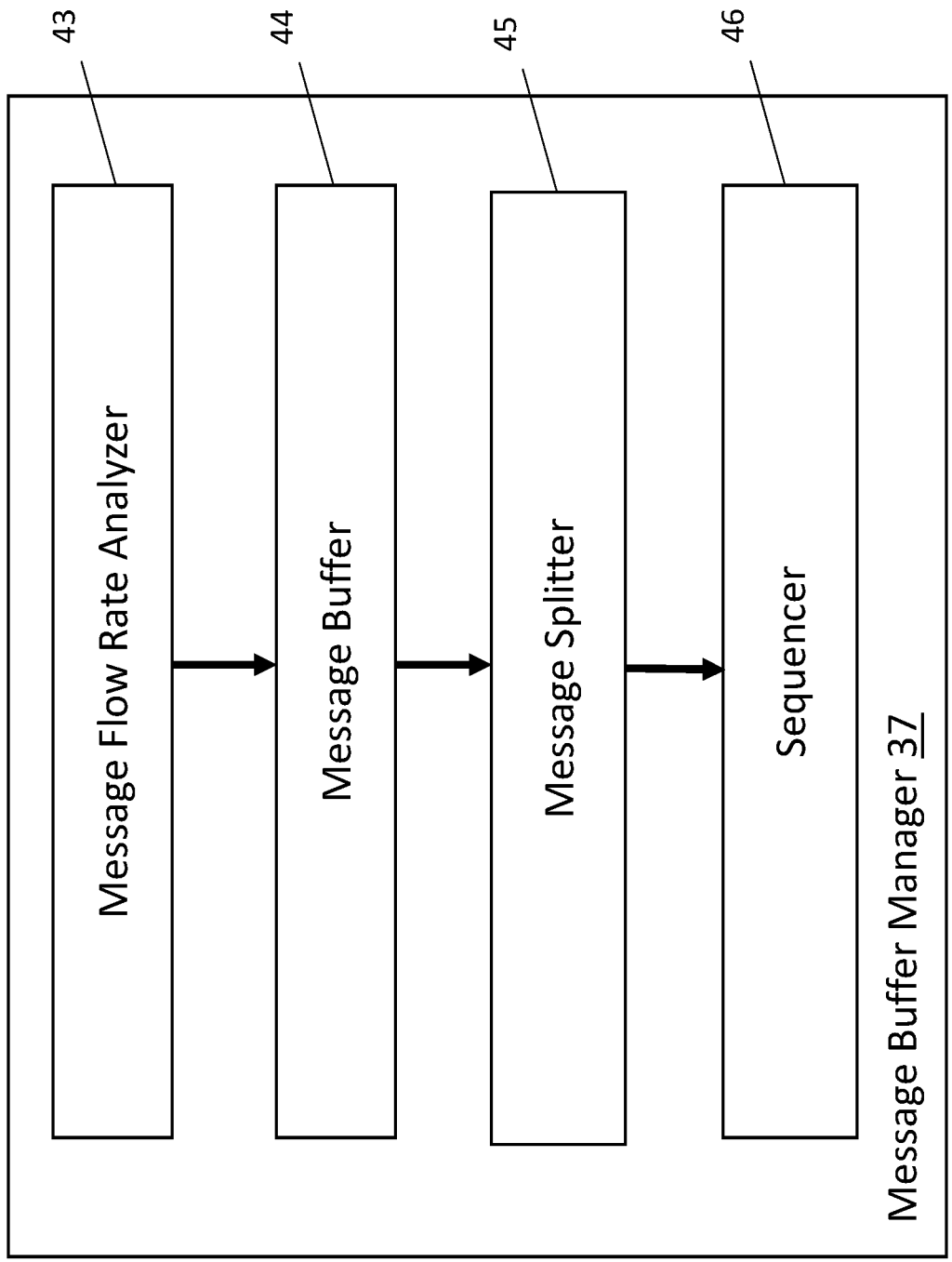
FIG. 7 is a block/flow diagram showing one embodiment of a message buffer manager, in accordance with one embodiment of the present disclosure.

FIG. 7 illustrates one embodiment of a message buffer manager 37. The message buffer manager 37 may include a message flow rate analyzer 43, a message buffer 44, a message splitter 45 and a sequencer 46. The message flow rate analyzer 43 measures the data rate of the transmission. The message buffer 44 maintains a constant rate of message data out flow. The message splitter 45 provides that the system for a cognitive and analytics engine 500 of the message connector 5 splits a single message into a number of fixed-length messages that will be sent to the same message processor. It splits up the messages into small chunks. For example, the message is split by first converting it into byte arrays and splitting these arrays into smaller chunks. A message sequencer 46 allows the system for a cognitive and analytics engine 500 of the message connector 5 to handle a series of messages. The message sequencer 46 provides the system with the ability to order the messages received in a specific order as they are transmitted to the target cloud 8*a*, 8*b*, 8*c*.

Figure 8:
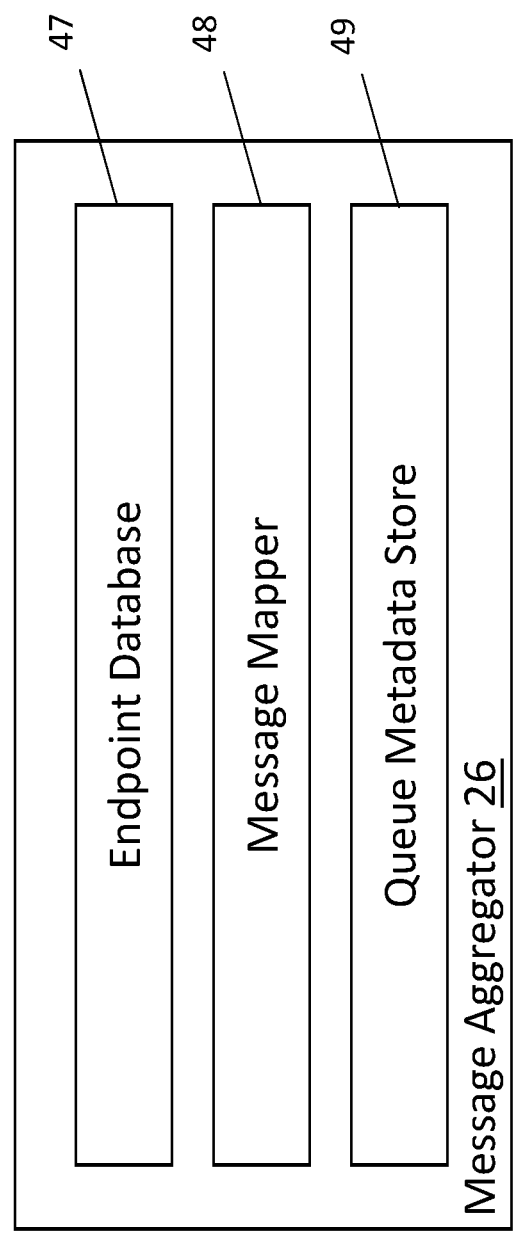
FIG. 8 is a block/flow diagram showing one embodiment of a message aggregator, in accordance with the present disclosure.

Referring to FIG. 5, the cognitive and analytics engine 500 of a message connector 5 further includes a message aggregator 26. This module maps to control path 14 of the process flow depicted in FIG. 4. FIG. 8 is a block/flow diagram showing one embodiment of a message aggregator 26. The message aggregator 26 further includes a module that aggregates multiple legacy message queues, e.g., streaming applications native message queue 7*b* into one or many destination message queues, e.g., target cloud 8*a*, 8*b*, 8c. Aggregation can be achieved based on user, role, or application. The endpoints of messages can be stored in a database, e.g., endpoint database 47. The messages are mapped from the source legacy message queue to the cloud native message queues. This can be provided by the message mapper 48. To service the above functionalities, the message aggregator has a data store, e.g., hardware memory for the queue metadata store 49, to store the queue metadata.

Referring to FIG. 5, the cognitive and analytics engine 500 of a message connector 5 may further include a recommendation engine 55, a compliance engine 56, and an insights based event trigger generator 57. In one embodiment, the recommendation engine 55 provides insights driven recommendations to choose the right instance type, policies and other cloud native services that will be provided by the target cloud 8a, 8b, 8c for the message received from the legacy application, e.g., streaming applications native message queue 7b. In one embodiment, the compliance engine 56 is a module that ensures that data and services, such as those provided at the target cloud 8a, 8b, 8c, are integrated with respect to the organization's compliance posture, in which the organization is running the streaming applications native message queue 7b.

Referring to FIG. 5, the cognitive and analytics engine 500 of a message connector 5 may further include an insights based event trigger generator 57 that will analyse the data flow of message and based on that control cloud features like auto-scaling. This module can take appropriate action based on recommendations.

The cognitive and analytics engine 500 of a message connector 5 may further include a hardware processor 27. As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

For migrating on-premise streaming applications data to a cloud application, the hardware processor 27 may employ artificial intelligence. For example, the hardware processor 27 may be integrated into an artificial intelligence providing device, such as an artificial neural network providing device.

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Each of the components for the system 500 that is depicted in FIG. 5 may be interconnected via a system bus 102.

The system 500 may assist in seamlessly migrating the traditional on-premise streaming application to cloud so that a customer running an on-premise application can exploit business benefits that will accrue from cloud nativity. The system 500 provides a highly available intelligent message connector hub, e.g., message connector hub 5, that can enable the streaming application to perform a feasibility assessment and dynamically transcode messages into a destination message/event format whilst taking advantages of cloud native characteristics, yet ensuring zero data loss. For example, the on-prem streaming applications can pass the actual messages to a compatible destination Message format on the cloud ensuring no data loss to assist cloud migration as well as benefit from cloud native functionalities. In some embodiments, the system can pass the control information from the events/messages from legacy/on-prem streaming applications to the destination cloud native services to take advantage of the cloud native features like auto-scaling. In further embodiments, the system allows migration of streaming messages from on-prem legacy environment to cloud native services seamlessly and autonomously powered by data driven insights.

Any of the systems or machines (e.g., devices) shown in FIG. 5 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed above with respect to the above described figures and such a special-purpose computer may, accordingly, be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Figure 9:
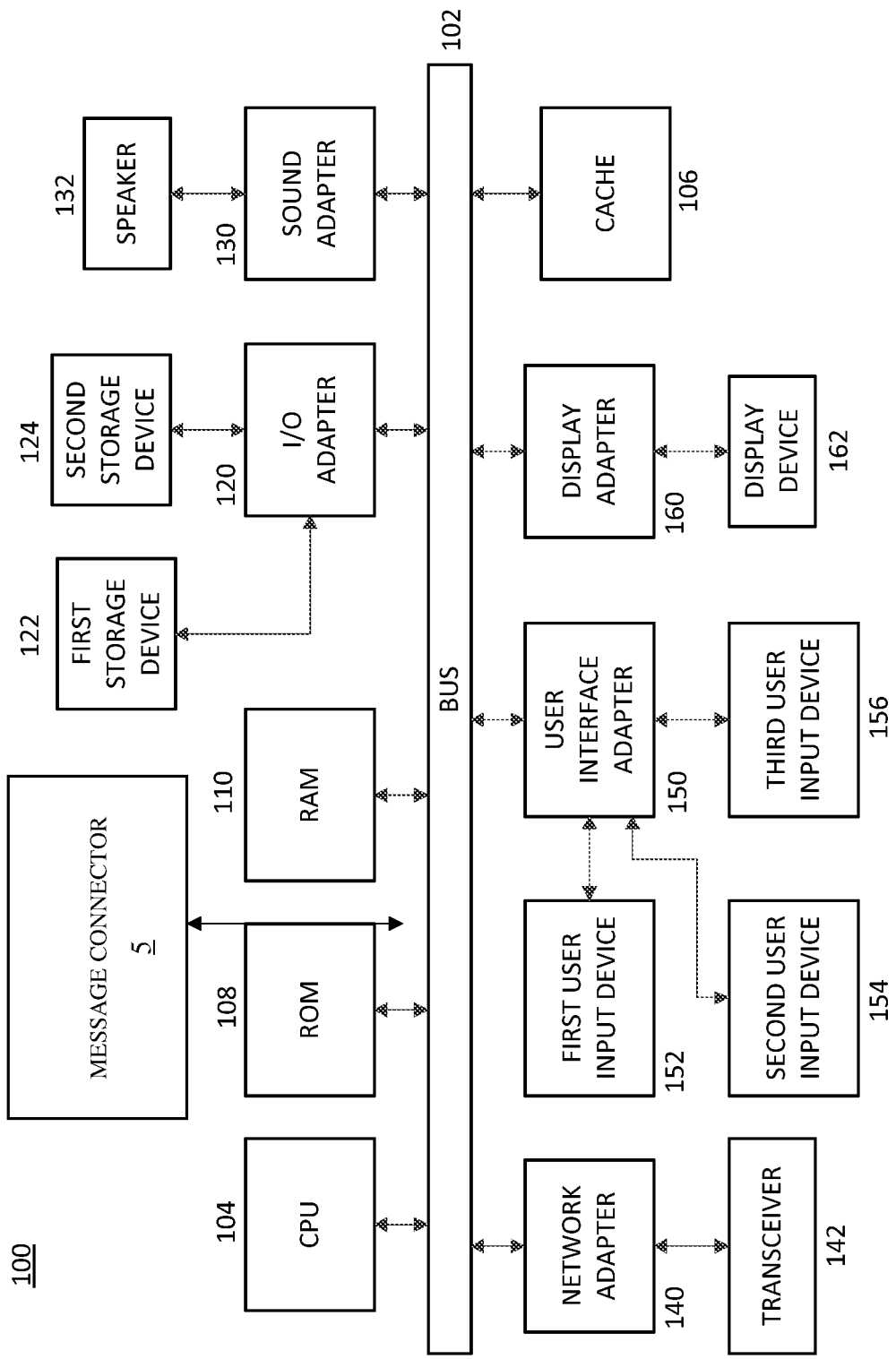
FIG. 9 is a block diagram illustrating a system that can incorporate the system depicted in FIG. 4 for the selection of perishable items using IOT devices, in accordance with one embodiment of the present disclosure.

The system 500 for migrating on-premise streaming applications data to a cloud application may be integrated into the processing system 100 depicted in FIG. 9. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium may be non-transitory. In one embodiment, a computer readable storage medium is provided that includes a computer readable program for migrating on-premise streaming applications data to a cloud application, wherein the computer readable program when executed on a computer causes the computer to perform the steps of registering target cloud locations with a message connector; and receiving at the message connector a source message from an on premise application. The steps stored on the computer readable storage medium also provide analyzing the source message for application to at least one of the target cloud applications, wherein analysis includes extracting communication data from the source message and meta data from the source message. The method may further include converting the source message to a format native to the target cloud application. The conversion by the message connector includes a cognitive engine employing at least one hardware processor to match a selected target cloud to policies of the on premise application based upon at least the meta data. The method can continue with transmitting the source message from the message connector to the target cloud application, wherein the source message has been converted to the format native to the target cloud.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The methods of the present disclosure may be practiced using a cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 10:
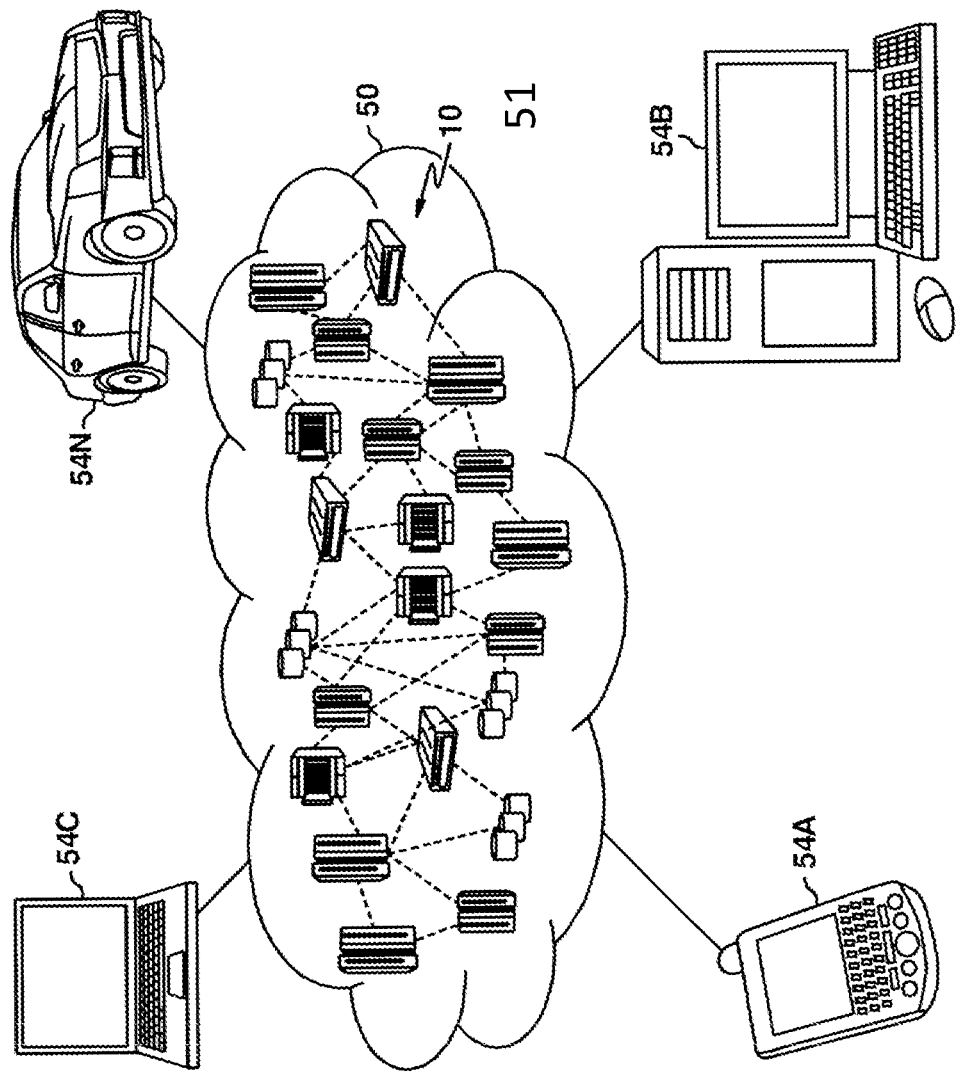
FIG. 10 depicts a cloud computing environment according to an embodiment of the present disclosure.

Referring now to FIG. 10, illustrative cloud computing environment 50 is depicted. As shown, cloud computing environment 50 includes one or more cloud computing nodes 51 with which local computing devices used by cloud consumers, such as, for example, mobile and/or wearable electronic devices 54A, desktop computer 54B, laptop computer 54C, and/or automobile computer system 54N may communicate. Nodes 51 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 51 and cloud computing environment 50 can communicate with any type of computerized device over any type of network and/or network addressable connection (e.g., using a web browser).

Figure 11:
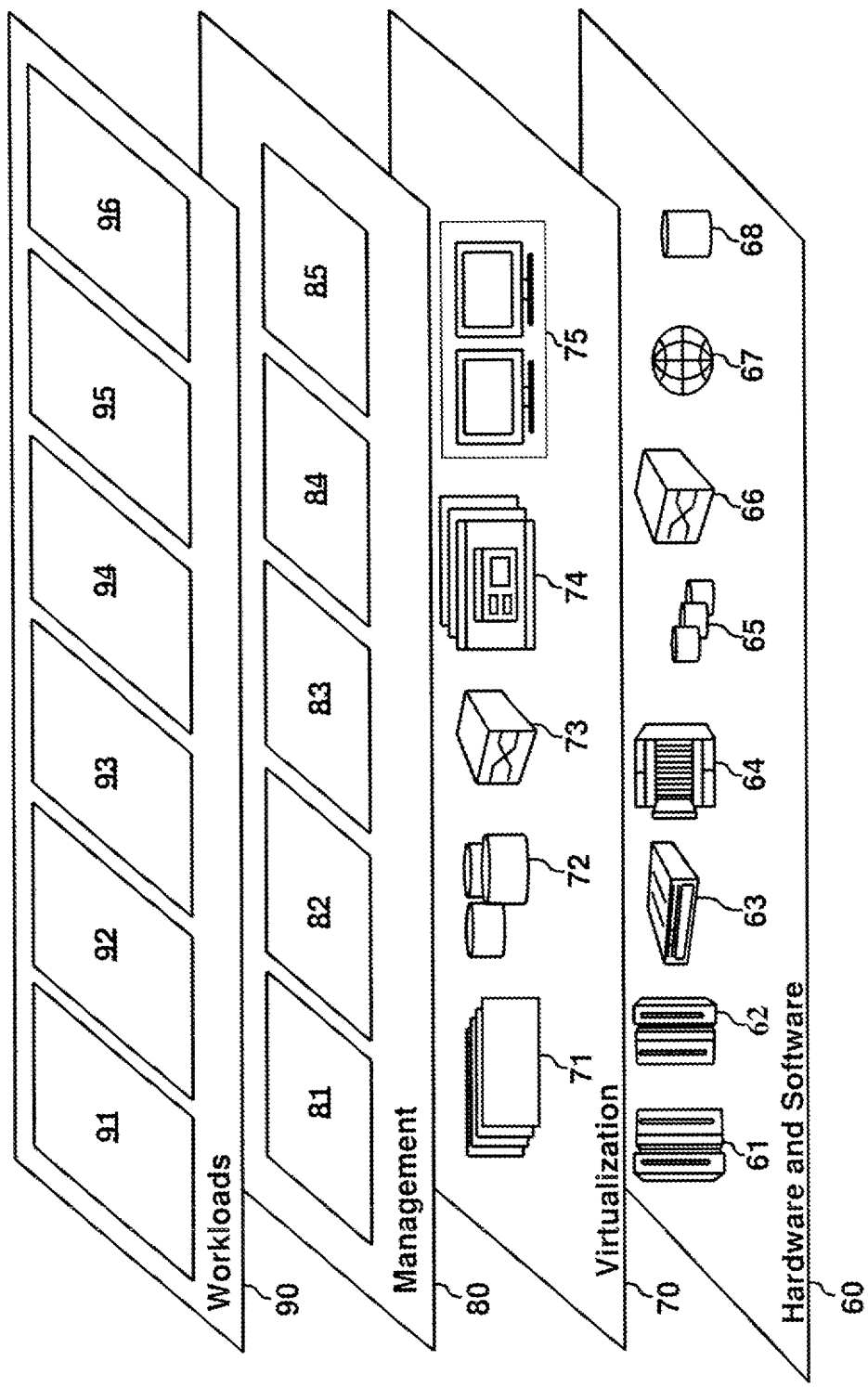
FIG. 11 depicts abstraction model layers according to an embodiment of the present disclosure.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application for the message connector hub, which is described with reference to FIGS. 1-11.

Having described preferred embodiments of a message connector as a service between a communication service and a cloud platform (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer implemented method for migrating streaming applications from on-premise non-cloud infrastructure to target clouds comprising:
   registering target cloud locations with a message connector;
   receiving at the message connector a source message from a message sending and receiving component of an on-premise application, in which the message sending and receiving component of the on-premise application is for transmitting data relevant to the on-premise application to a user that is using the on-premise application;
   analyzing the source message for feasibility of migrating the on-premise application to a target cloud, wherein analysis includes extracting communication data from the source message and meta data from the source message;
   converting the source message to a format native to a target cloud application, wherein the conversion by the message connector includes a cognitive engine employing at least one hardware processor to match a selected target cloud to on-premise application based upon at least the meta data; and
   transmitting the source message from the message connector to the target cloud application, wherein the source message has been converted to the format native to the target cloud.

2. The computer implemented method of claim 1, wherein said analyzing the source message includes analyzing a source upstream application message queue format and said analyzing for the target cloud application includes analyzing characteristics of a cloud native messaging systems in the target cloud.

3. The computer implemented method of claim 1, wherein the source message data is sent from a streaming application message queue to the message connector, and the source message data is sent from the message connector to a cloud native message queue.

4. The computer implemented method of claim 1, wherein the source message is further processed with the native applications of the target cloud.

5. The computer implemented method of claim 1, wherein the on-premise application is run on a data center.

6. The computer implemented method of claim 1, wherein the message connector includes logic to retain a message queue attribute of a non destructive read or destructive read for a message data.

7. The computer implemented method of claim 1, wherein the message connector analyzes an upstream application message queue of the target cloud for format of the cloud native messaging systems and provides a feasibility assessment.

8. A system for migrating on-premise streaming applications from on-premise non-cloud infrastructure to target clouds comprising:
at least one interface for communicating with a cloud message que of target cloud locations;
at least one interface for communicating with an on-premise message queue for an on-premise streaming application, the at least one interface for communicating with the on-premise message que receives a source message from the on premise streaming application, in which the source message is for transmitting data relevant to the on-premise application to a user that is using the on-premise application; and
a message converter that analyzes the source message for application to at least one of the target cloud locations, wherein analysis includes extracting communication data from the source message and meta data from the source message, the message converter may further provide converting the source message to a format native to the target cloud application, wherein the conversion by the message converter includes a cognitive engine having at least one hardware processor to match a selected target cloud to the on premise message queue based upon at least the meta data.

9. The system of claim 8, wherein the source message data is sent from a streaming application message queue to the message connector, and the source message data is sent from the message connector to a cloud native message queue.

10. The system of claim 8, wherein the source message is further processed with the native applications of the target cloud.

11. The system of claim 8, wherein the on-premise application is run on a data center.

12. The system of claim 8, wherein the message connector includes logic to retain the message queue attribute of a non destructive read or destructive read for the message data.

13. The system of claim 8, wherein the message connector analyzes an upstream application message queue of the target cloud for format of the cloud native messaging systems and provides a feasibility assessment.

14. The system of claim 8, wherein the message connector includes a message buffer manager for determining the amount of messages in the on-premise message queue and the cloud message queue.

15. The system of claim 8, wherein the message connector includes an auto detector for detecting when the on-premise message queue contains source message data.

16. A computer readable storage medium comprising a computer readable program for migrating on-premise streaming applications from on-premise non-cloud infrastructure to public clouds, wherein the computer readable program when executed on a computer causes the computer to perform the steps of:
registering target cloud locations with the message connector;
receiving at a message connector a source message from a message sending and receiving component of an on-premise application, in which the message sending and receiving component of the on-premise application is for transmitting data relevant to the on-premise application to a user that is using the on-premise application;
analyzing the source message for application to at least one of the target cloud applications, wherein analysis includes extracting communication data from the source message and meta data from the source message;
converting the source message to a format native to the target cloud application, wherein the conversion by the message connector includes a cognitive engine employing at least one hardware processor to match a selected target cloud to the on-premise application based upon at least the meta data; and
transmitting the source message from the message connector to the target cloud application, wherein the source message has been converted to the format native to the target cloud.

17. The computer readable storage medium of claim 16, wherein the source message data is sent from a streaming application message queue to the message connector, and the source message data is sent from the message connector to a cloud native message queue.

18. The computer readable storage medium of claim 16, wherein the source message is further processed with the native applications of the target cloud.

19. The computer readable storage medium of claim 16, wherein the on-premise application is run on a data center.

20. The computer readable storage medium of claim 16, wherein the message connector includes logic to retain the message queue attribute of a non destructive read or destructive read for the message data.

* * * * *